(12) United States Patent
Nishimura et al.

(10) Patent No.: US 6,754,200 B1
(45) Date of Patent: Jun. 22, 2004

(54) RATE CONTROL SYSTEM OF TCP LAYER

(75) Inventors: Kazuto Nishimura, Kawasaki (JP);
Tomohiro Ishihara, Kawasaki (JP);
Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 729 days.

(21) Appl. No.: 09/623,222

(22) Filed: Aug. 25, 2000

Related U.S. Application Data

(63) Continuation of application No. PCT/JP99/00949, filed on Feb. 26, 1999.

(30) Foreign Application Priority Data

Feb. 26, 1998 (JP) ............................................. 10-044725

(51) Int. Cl.⁷ ................................................. H04J 3/24
(52) U.S. Cl. ........................ 370/349; 370/238; 370/401
(58) Field of Search ................................ 370/229, 230, 370/231, 232, 233, 234, 235, 236, 237, 238, 328, 338, 401, 349

(56) References Cited

U.S. PATENT DOCUMENTS

| | | | | |
|---|---|---|---|---|
| 6,038,216 A | * | 3/2000 | Packer ........................ | 370/231 |
| 6,038,606 A | * | 3/2000 | Brooks et al. ............... | 709/235 |
| 6,052,819 A | * | 4/2000 | Barker et al. ................ | 714/776 |
| 6,201,791 B1 | * | 3/2001 | Bournas ...................... | 370/234 |
| 6,205,498 B1 | * | 3/2001 | Habusha et al. .............. | 710/29 |
| 6,208,620 B1 | * | 3/2001 | Sen et al. .................... | 370/231 |
| 6,249,530 B1 | * | 6/2001 | Blanco et al. ................ | 370/468 |
| 6,272,148 B1 | * | 8/2001 | Takagi et al. ................ | 370/469 |
| 6,415,410 B1 | * | 7/2002 | Kanerva et al. ............. | 714/749 |
| 6,490,251 B2 | * | 12/2002 | Yin et al. ................. | 370/236.1 |
| 6,529,477 B1 | * | 3/2003 | Toporek et al. ............. | 370/235 |
| 6,535,482 B1 | * | 3/2003 | Hadi Salim et al. ......... | 370/229 |
| 6,625,118 B1 | * | 9/2003 | Hadi Salim et al. ......... | 370/229 |

FOREIGN PATENT DOCUMENTS

JP 61-212139 9/1986

OTHER PUBLICATIONS

Yavatkar et al, "Improving End–to–End Performance of TCP over Moblie Internetworks", 1995, IEEE, pp. 146–152.*
Bakre et al, "I–TCP: Indirect TCP for Mobile Hosts", 1995, IEEE, pp. 136–143.*
Amir et al, "Efficient TCP over Networks with Wireless Links," 1995, IEEE, pp. 35–40.*

(List continued on next page.)

*Primary Examiner*—Douglas Olms
*Assistant Examiner*—Van Nguyen
(74) *Attorney, Agent, or Firm*—Katten Muchin Zavis Rosenman

(57) ABSTRACT

The present invention relates to the rate control system of a TCP layer in communications conducted between terminals 1 and 3 via a base station 2 using a wireless link. An object of the present invention is to avoid the fruitless reduction of throughput in communications conducted via a wireless link. If the discard of a packet transmitted from the base station 2 to the terminal 3 via a wireless link is detected when the packet is transmitted from the terminal 1 to the terminal 3, the base station or terminal 3 is provided with means for notifying the terminal 1 of a wireless packet discard using a TCP layer. The terminal 1 is configured in such a way that if the wireless packet discard notification is received, a TCP layer control unit 10 does not exercise slow-start control at the time of re-transmission and re-transmits the discarded packet at a rate adopted before the reception of the notification.

10 Claims, 15 Drawing Sheets

OTHER PUBLICATIONS

Balakrishnan et al, "A Comparison of Mechanicms for Improving TCP Performance over Wireless Links", 1997, IEEE, pp. 756–769.*

Chim et al, "End–to–End Acknowledgement for Indirect TCP over Wireless Internetworks", 1997, IEEE, pp. 774–777.*

Bakre et al, "Implementation and Performance Evaluation of Indirect TCP," 1997, IEEE, pp. 260–278*

Goel et al, "Improving TCP Performance Over Wireless Links", 1998, IEEE, pp. 332–335.*

Sparscheck et al, "Optimizing TCP Forwarder Performance," 2000, IEEE, pp. 146–157.*

Hiroshi Yoshida, et al., "The Architecture and Control Method of Packet Data Communication for Personal Handy–phone System", NTT R&D vol. 45 No. 11. Issued Nov. 10, 1996. pp. 1099–1107.

H. Balakrishnan et al., "Improving TCP/IP Performance over Wireless Networks" in Proceedings of ACM Mobicom '95. Issued Nov. 1995.

H. Balakrishnan et al. "A Comparison of Mechanisms for Improving TCP Performance over Wireless Links", ACM Transactions on Networking, vol. 5, No. 6, IEEE. Issued Dec. 1997. pp. 756–769.

* cited by examiner

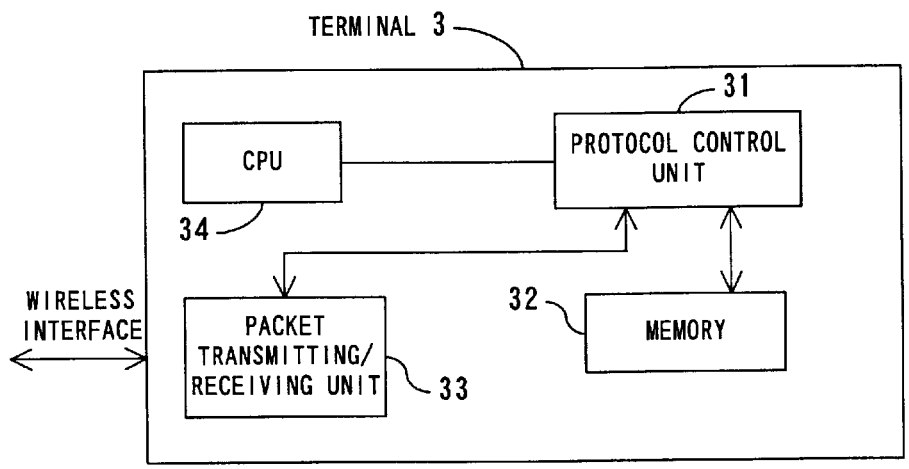
F I G. 6
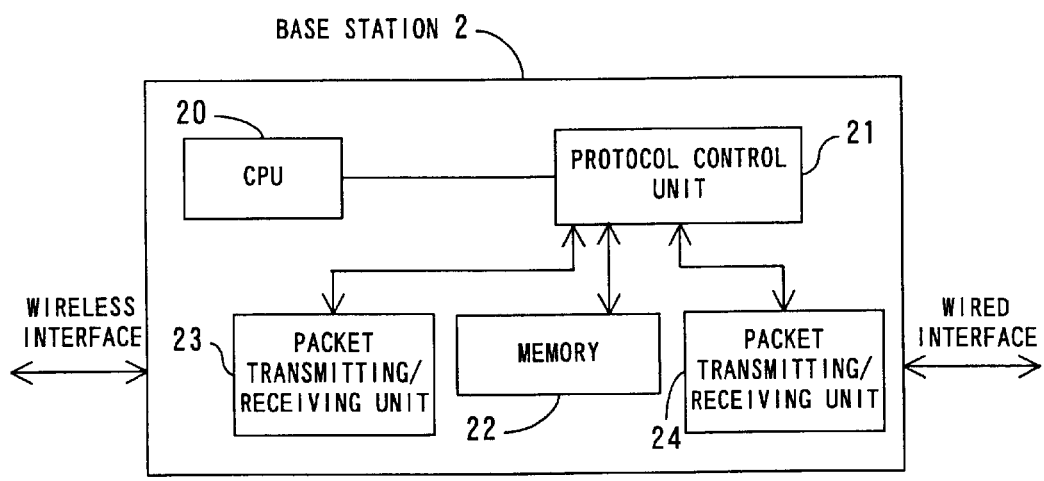
F I G. 7

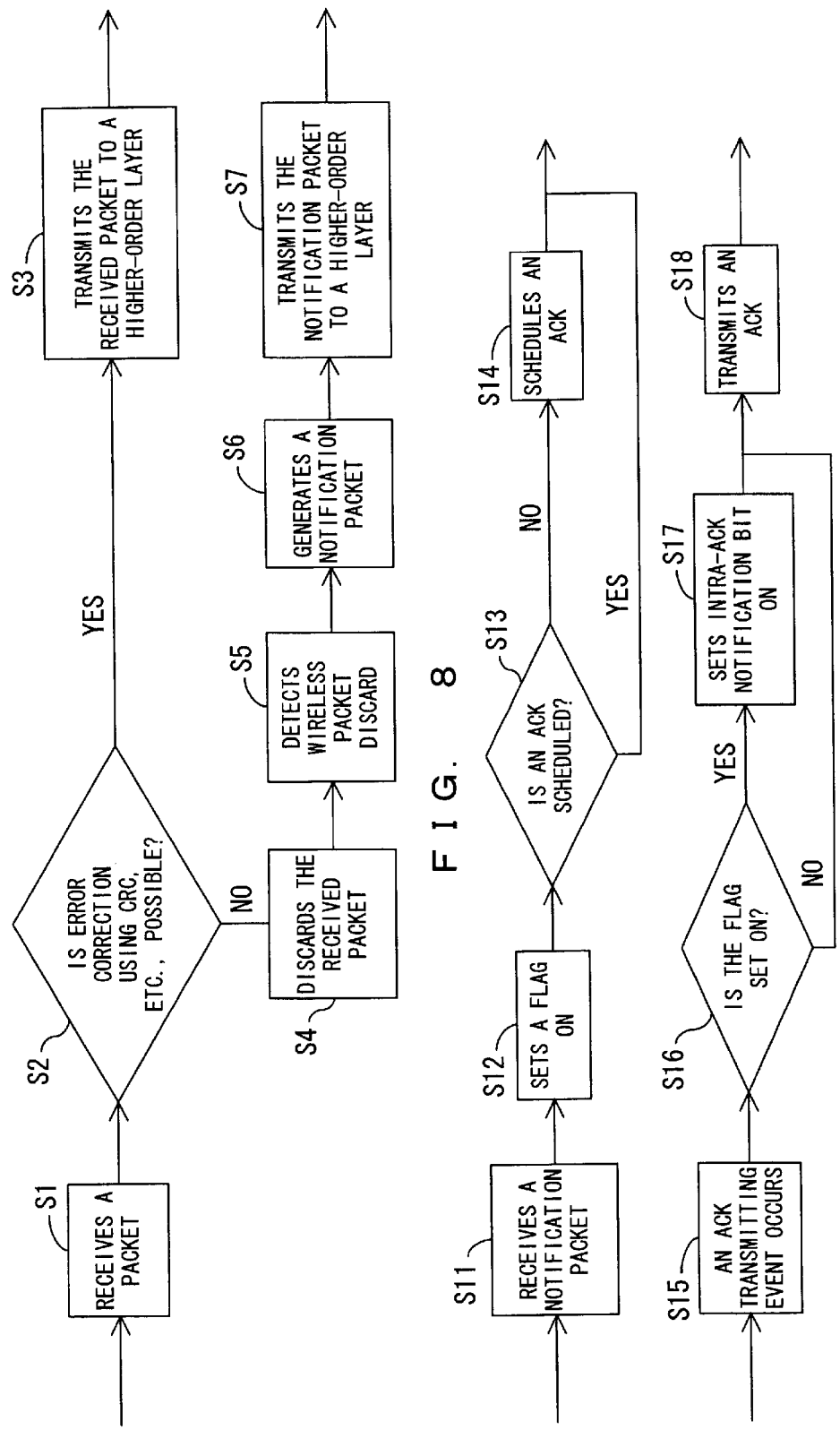

RATE CONTROL SYSTEM OF TCP LAYER

CROSS REFERENCE TO RELATED APPLICATION

This application is a continuation of International PCT Application No. PCT/JP99/00949 filed on Feb. 26, 1999.

BACKGROUND OF THE INVENTION

1. Field of the Invention

The present invention relates to a rate control system of a TCP layer in communications conducted between two terminals which are connected via a wireless link.

2. Description of the Related Art

A TCP (Transmission Control Protocol) corresponds to a transport layer, which is the fourth layer of an OSI (Open System Interconnection) and is a transport layer protocol, and is currently installed in many personal computers and workstations because the TCP guarantees the high-reliability of end-to-end transmission and is suited for data communications.

The TCP prevents network congestion from occurring by rate control using a slow-start function (function to start transmission at a low transmission rate and to gradually increase the transmission rate) and implements high-reliability compared with re-transmission control and window control. In particular, the slow-start function is an algorithm for implementing recovery from the congested state causig a packet discard by greatly reducing the transmission rate once and then gradually increasing the transmission rate, and is a excellent feature of the rate control in the TCP. However, if this technology is applied to a wireless environment without modification, inefficient operation occurs due to this slow-start function and a reduction of throughput occurs when there is a packet discard. Therefore, improvement is desired.

The slow-start function, which is a feature of the rate control of the TCP is a system for reducing the transmission rate when a packet is discarded and for gradually increasing the rate based on an acknowledgement (ACK) from the opposite terminal, which is described with reference to FIG. 1.

FIG. 1 shows an example of the rate control of a conventional TCP. The horizontal and vertical axes in FIG. 1 indicate time and transmittable data size (WS: Window size), respectively. The dotted lines represented by a in the upper section of FIG. 1 indicate the change of control using a window (data size receivable at the opposite terminal), and a plurality of vertical solid lines b1–bn indicate the data size transmitted by a sender. Circles separating the vertical solid lines indicate the maximum segment size of the TCP, and data transmitted from the TCP are divided into a size that is not more than this maximum size and are transmitted. Since there are no data in a receiving window when transmission is started, data equivalent to the window size can be originally transmitted at one time. However, in order to avoid the congestion of a network due to the rapid increase of the rate, the data size to be transmitted at one time is restricted by the slow-start.

Specifically, first the data size represented by b1 is transmitted, and when an ACK is received from the opposite terminal, data are transmitted at a higher transmission rate, such as b2, b3, ... (see section A in FIG. 1). In this way, the transmission rate continues to be increased. However, the more ACKs that are received, the looser the slow-start restriction becomes. The rate control gradually shifts to window control (see section B in FIG. 1). In this way, if there is a packet discard while transmission continues at a transmission rate bn, an ACK is not returned from the opposite terminal. Therefore, presently a re-transmission time-out (represented by RTO) occurs. If the re-transmission of data is started after the re-transmission time-out occurs, the transmission rate begins with data size b1 and then is gradually controlled by slow-start control (see section C in FIG. 1).

In the meantime, a communication form in which a laptop personal computer, etc., is connected via a modem to a portable terminal explosively spread as an audio communications tool, such as cellular phones, PHS (Personal Handyphone System), etc., and data communications (TCP communications) conducted over a wireless link, is also being spread.

However, the TCP does not originally take into consideration that a wireless link is applied to a physical layer, and it is a protocol which is designed on the assumption that a physical line is a wired line. Specifically, the above-described slow-start function is based on a concept of congestion avoidance, and the dissolution of congestion is intended by reducing the transmission rate. In other words, the TCP is an algorithm which is introduced based on the assumption that the cause of a packet discard is congestion.

However, in the case of TCP communications via a wireless link, a packet discard can occur not only due to congestion, but also due to a wireless characteristic, such as fading, etc. Although in such a case, the slow-start function works in a TCP layer and no effect can be obtained, since the increase/decrease of the transmission rate and an error characteristic in a wireless link are independent phenomena. Since there is a packet discard in the conventional rate control system of the TCP layer, the transmission rate is reduced although no effect can be expected, throughput is reduced without benefit, which is a problem.

Therefore, an object of the present invention is to provide the rate control system of a TCP layer suited for a wireless environment where a fruitless reduction of throughput can be avoided even in communications via a wireless link.

DISCLOSURE OF INVENTION

According to the present invention, if the discard of a packet transmitted via a wireless link is detected in a prescribed layer, in order to solve the above-described problem, a layer with a slow-start function is notified of the packet discard.

Then, the slow-start function can be operated according to the peculiar characteristic of a wireless link, even if the slow-start function assumes a wired link and the protocol does not assume a wireless link, and thereby a fruitless reduction of throughput can be prevented in communications via a wireless link.

According to one aspect of the present invention, if the discard of a packet transmitted via a wireless link is detected, the packet is re-transmitted without the slow-start performance.

In this way, if a packet discard occurs due to a cause other than congestion, the packet can be re-transmitted without the reduction of the transmission rate, and as a result, the occurrence of the fruitless reduction of throughput can be prevented.

BRIEF DESCRIPTION OF DRAWINGS

FIG. 6 shows an example of the hardware configuration of a terminal provided with a wireless function.

FIG. 7 shows an example of the hardware configuration of a base station provided with a wireless function.

FIG. 8 is a flowchart showing the process of a wireless layer on the receiving side.

FIG. 9 is a flowchart showing the process of a TCP layer on the receiving side.

DESCRIPTION OF THE PREFERRED EMBODIMENTS

The rate control system in one preferred embodiment of the present invention is described below with reference to the drawings.

Figure 1:
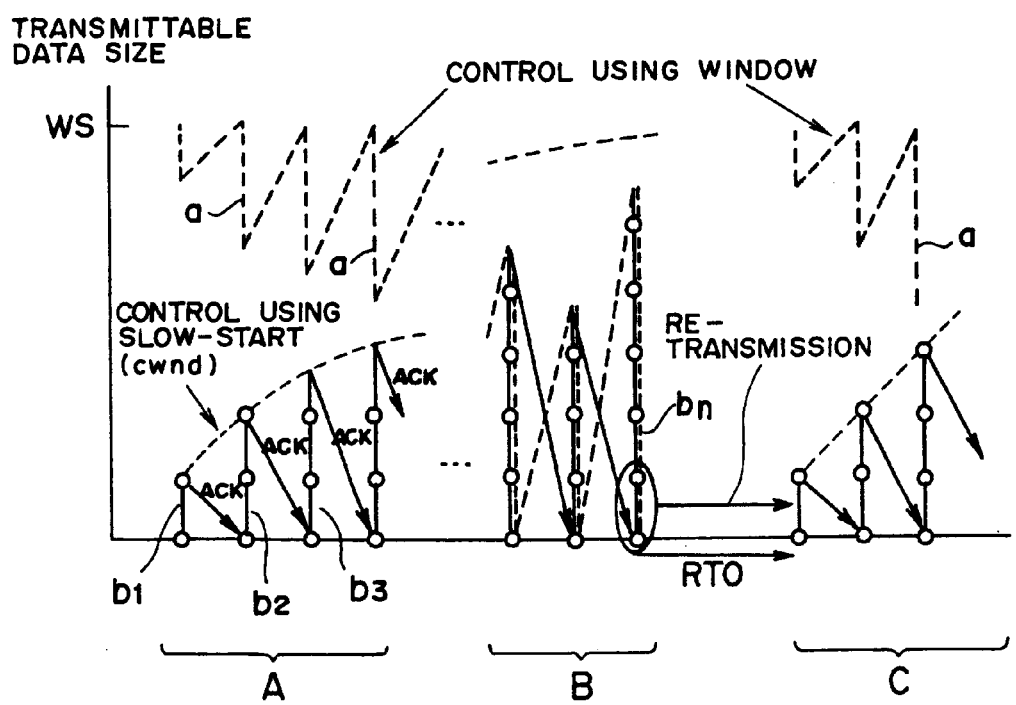
FIG. 1 shows an example of the rate control of the conventional TCP.
Figure 2:
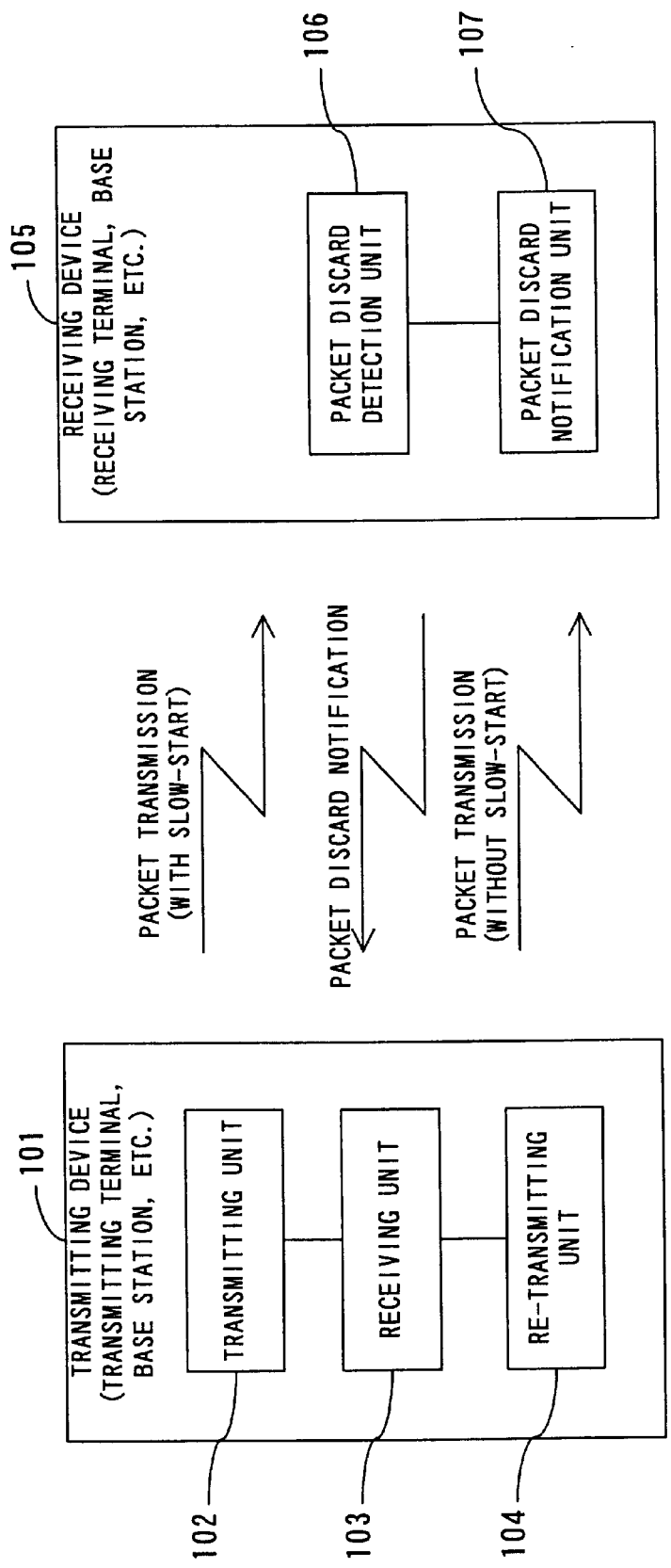
FIG. 2 shows the respective configurations of a transmitting device and receiving device in the first preferred embodiment of the present invention.

FIG. 2 shows the respective configurations of a transmitting device and receiving device in the first preferred embodiment of the present invention. In FIG. 2, the transmitting device 101 comprises a transmitting unit 102, a receiving unit 103 and a re-transmitting unit 104, and the receiving device 105 comprises a packet discard detection unit 106 and a packet discard notification unit 107. In this preferred embodiment, the transmitting device 101 communicates according to a protocol with a slow-start function.

If the transmitting unit 102 transmits a packet via a wireless link using slow-start, the receiving device 105 receives the packet transmitted from the transmitting device 102. If the receiving device 105 receives the packet, the packet discard detection unit 106 checks whether the packet is discarded. If the packet discard detection unit 106 detects the discard of the packet transmitted from the transmitting device, the packet discard notification unit 107 notifies the transmitting device 101 of the packet discard. If the receiving unit 103 receives the packet discard notification, the re-transmitting unit 104 re-transmits the packet without implementing slow-start.

The transmitting device 101 is a transmitting terminal or base station, etc., and the receiving device 105 is a receiving terminal or base station, etc.

As described above, if there is a packet discard in a wired communication, the packet discard is considered to be due to congestion. Therefore, if the discarded packet is re-transmitted, by using the slow-start function, the re-transmitted packet can be prevented from being discarded again and a good communication condition can be secured.

If there is a packet discard in a wireless communication, the packet discard is considered to be due to a cause other than congestion. Therefore, if the discarded packet is re-transmitted, the packet is re-transmitted without using slow-start.

In this way, if there is a packet discard due to congestion, the packet can be prevented from being discarded by effectively using slow-start and if there is a packet discard due to a cause other than congestion, throughput can be prevented from dropping by preventing slow-start from operating in vain.

Figure 3:
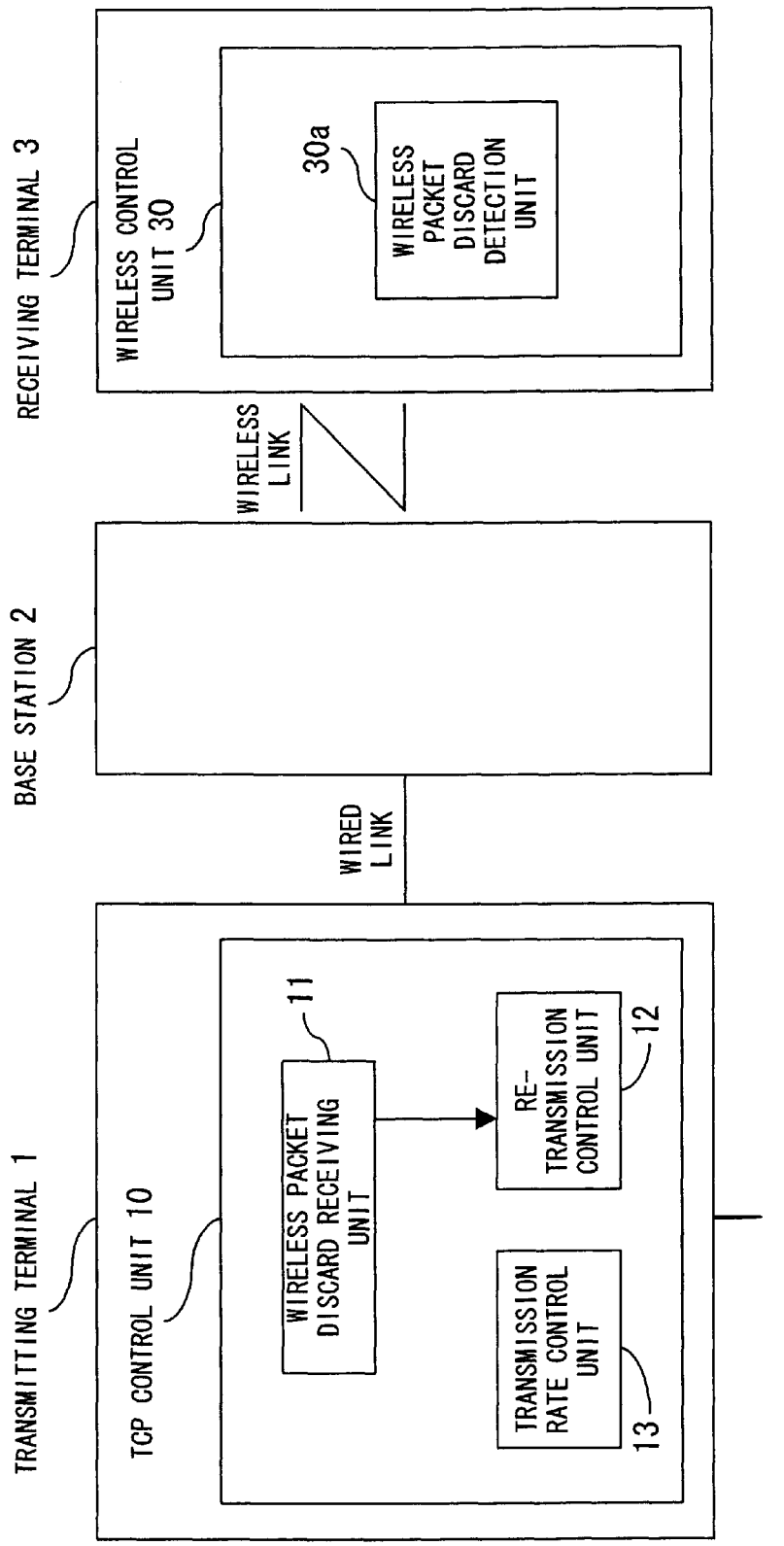
FIG. 3 shows the respective configurations of a transmitting terminal and receiving terminal in the second preferred embodiment of the present invention.

FIG. 3 shows the respective configurations of a transmitting terminal and receiving terminal in the second preferred embodiment of the present invention. In FIG. 3, a transmitting terminal, a base station which is connected to the transmitting terminal via a wired link and communicates with a receiving terminal via a wireless link, and a receiving terminal which communicates with the base station via a wireless link are represented by 1, 2 and 3, respectively. The TCP control unit of the transmitting terminal, a wireless packet discard receiving unit, a re-transmission control unit, and a transmission rate control unit are represented by 10, 11, 12 and 13, respectively. The wireless control unit of the receiving terminal 3 and the wireless packet discard detection unit of the wireless control unit are represented by 30 and 30a, respectively.

In the preferred embodiment shown in FIG. 3, if information is transmitted from the transmitting terminal 1 to the receiving terminal 3 via the base station 2 via a wireless link, communications are controlled according to the protocol of a TCP layer. If there is an error in a packet transmitted from the base station 2 and the error cannot be corrected at the receiving terminal 3 when the information is transmitted from the transmitting terminal 1 to the receiving terminal 3 via the base station 2 with a transmission rate stored in the transmission rate control unit 13, a wireless packet discard is detected in the wireless packet discard detection unit 30a of the wireless control unit 30. Notification of the detected packet discard information is made from the receiving terminal 3 to the transmitting terminal 1 via the base station 2.

If the wireless packet discard notification is received in the wireless packet discard receiving unit 11 of the TCP control unit 10, the transmitting terminal 1 drives the re-transmission control unit 12. If the re-transmission control unit 12 is started by the wireless packet discard receiving unit 11, the re-transmission control unit 12 re-transmits the discarded packet using the transmission rate (including window control) and window size stored in the transmission rate storing unit 13 until immediately before the re-transmission. As described above, if there is a wireless packet discard, a slow-start function does not function, unlike the conventional case. Therefore, throughput can be improved.

Although in FIG. 3, the transmitting terminal 1 and the base station 2 are connected via a wired link, and the base station 2 and the receiving terminal 3 are connected via a wireless link, communications, based on the same principle, can also be conducted without using a slow-start function if the transmitting terminal 1 and the base station 2 are connected via a wireless link.

If there is a packet discard due to the congestion of a network, re-transmission is controlled using slow-start, as in the conventional case.

Figure 4:
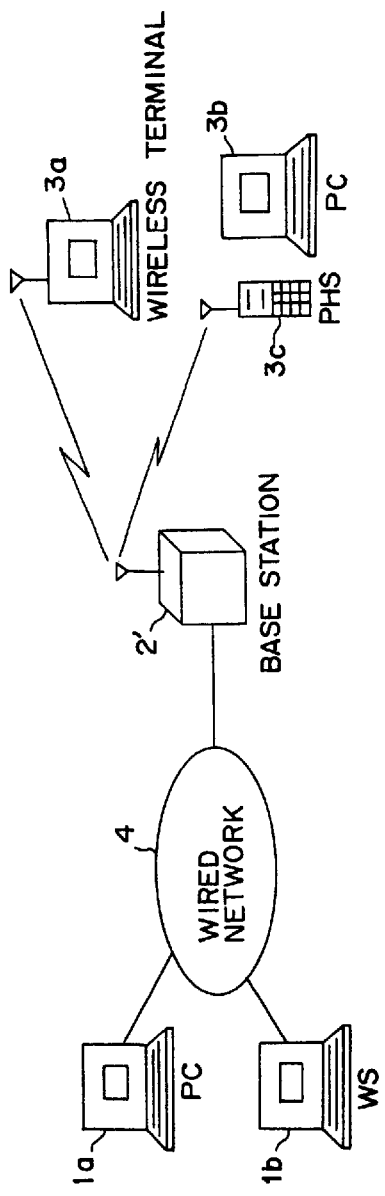
FIG. 4 shows an example of the system configuration in which the preferred embodiment shown in FIG. 3 is put into practice.

FIG. 4 shows an example of the system configuration in which the preferred embodiment shown in FIG. 3 is put into practice. In this configuration, a personal computer, a workstation, a wireless base station, a wireless terminal, a personal computer connected to a PHS terminal 3c which communicates with the base station 2 via a wireless link and a wired network are represented by 1a, 1b, 2, 3a, 3b and 4, respectively.

In the preferred embodiment shown in FIG. 4, the personal computer 1a and the workstation 1b are connected to the base station 2 via a wired network 4, and the base station 2 communicates with the wireless terminal 3a and personal computer 3b via a wireless link. There are two cases: one case is where the personal computer 1a or workstation 1b transmits packets and the other case is where the personal computer 1a or workstation 1b receives packets. The respective cases are described below using the following preferred embodiments.

Figure 5:
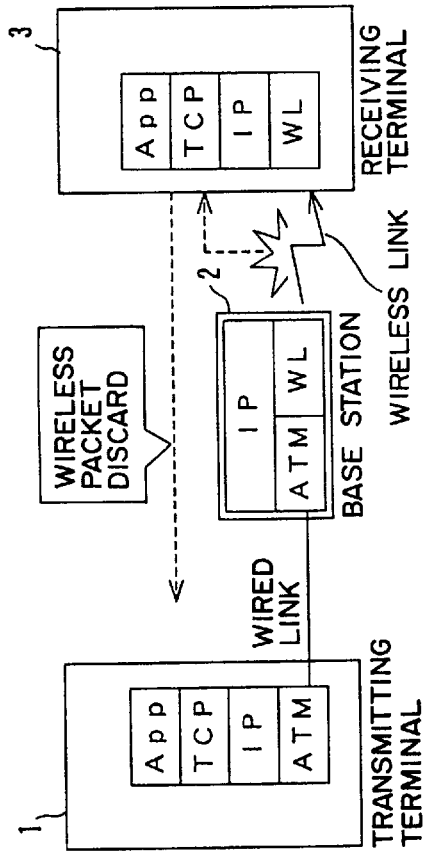
FIG. 5 shows the first example of the connection configuration in which notificatin of a wireless discard is made.

FIG. 5 shows the first example of the connection configuration in which notification is made of a wireless packet discard.

In FIG. 5, a transmitting terminal is represented by 1, which corresponds to the personal computer 1a or workstation 1b shown in FIG. 4, a base station connected to the transmitting terminal 1 via a wired link (including the wired network 4 shown in FIG. 4) is represented by 2, and a receiving terminal which communicates with the base station 2 via a wireless link is represented by 3, which corresponds to the wireless terminal 3a or personal computer 3b including a PHS.

FIG. 5 mainly shows a protocol control function provided in the terminals 1 and 3 and base station 2. Each of the terminals 1 and 3 is provided with a four-layer protocol control function. The second layer (data link layer) of the terminal 1 is an ATM protocol (Asynchronous Transfer Mode) and indicates a transfer protocol based on transmission in units of cells. The second layer of the terminal 3 is a wireless layer (indicated by WL). The third layer of the terminal 1 or 3 is an IP (Internet Protocol), the forth layer (transport layer) indicates a TCP protocol and the top layer in this preferred embodiment is an application layer (indicated by App). The base station 2 is provided with both a data link layer and a network layer as a protocol control function needed to implement a relay function. The wired side of the data link is provided with an ATM, and the wireless side is provided with a wireless layer (WL). The network layer is provided with an IP like the terminals 1 and 3.

FIG. 6 shows an example of the hardware configuration of the terminal 3 provided with a wireless function. The terminal 3 corresponds to the wireless terminal 3a shown in FIG. 4, and comprises a CPU (Central Processing Unit) 34, a protocol control unit 31 for controlling a protocol corresponding to each layer, a memory 32 for storing a program and data and a packet transmitting/receiving unit 33 for conducting the transmission/reception of packets via a wireless interface.

FIG. 7 shows an example of the hardware configuration of the base station 2 provided with a wireless function. The base station 2 comprises a CPU 20, a protocol control unit 21, a memory 22, a packet transmitting/receiving unit 23 provided corresponding to a wireless interface, and a packet transmitting/receiving unit 24 provided corresponding to a wired interface.

In the example connection configuration shown in FIG. 5, communications between the base station 2 and the receiving terminal 3 via a wireless link sometimes suffer a bit error due to the influence of fading, etc. Therefore, a code with an error correction function, such as a CRC (Cyclic Redundancy Check), etc., is often attached to a packet which passes a wireless section. If the error is large, the error cannot be corrected in the wireless layer (WL) of the receiving terminal 3 and the packet is sometimes discarded in the wireless layer. Specifically, whether a packet discard occurs due to a wireless error can be judged in the wireless layer of the receiving terminal 3. Then, notificatin of a packet discard due to a wireless error is made from the wireless layer to the TCP layer. A method for posting notification of a packet discard due to a wireless error is described later. Then, notificatin of the packet discard due to a wireless error is made to the TCP layer under the control of the TCP layer of the receiving terminal 3.

On receipt the notification of the packet discard due to a wireless error, the TCP layer of the transmitting terminal 1 judges that this packet discard is not due to congestion, and re-transmits the packet without using slow-start. In this way, slow-start can be prevented from operating despite no congestion, and as a result, throughput can be prevented from being reduced to no effect.

FIG. 8 is a flowchart showing the process of a wireless layer on the receiving side.

As shown in FIG. 8, on receipt of a packet from the base station 2 via a wireless link (step S1), the wireless layer (WL) of the receiving terminal 3 shown in FIG. 5 checks the packet using a CRC, etc., and if an error is detected, it corrects the error and judges whether the error can be corrected (step S2). If the error can be corrected, the wireless layer corrects the error and transmits the packet to a high-order layer (step S3). If it is found that the error cannot be corrected, the wireless layer discards the received packet (step S4) and detects a wireless packet discard (step S5). In this case, the wireless layer generates a notification packet for the wireless packet discard for the high-order layer (the TCP layer of the terminal 3) (step S6) and transmits the notification packet to the high-order layer (step S7).

FIG. 9 is a flowchart showing the process of a TCP layer on the receiving side.

On receipt of the notification packet for a wireless packet discard, as shown in FIG. 9 (step S11), the TCP layer of the receiving terminal 3 sets a flag on (step S12), judges whether an ACK (response message to the transmission source) is scheduled (step S13). If the ACK is not scheduled, the TCP layer schedules the ACK (step S14). Then, if an ACK transmitting event occurs in the receiving terminal 3 (step S5), the TCP layer judges whether the flag in step S12 is on (step S16). If the flag is on, the TCO layer sets a notification bit in the ACK (bit predetermined in the ACK to indicate a wireless packet discard) on (step S17) and transmits the ACK to the transmitting terminal (step S18). Although in this preferred embodiment, notification of a packet discard due to a wireless error is made using a bit in the header of the ACK, notification of the packet discard can also be made using the data of a packet. The detailed notification method is described later.

Figure 10:
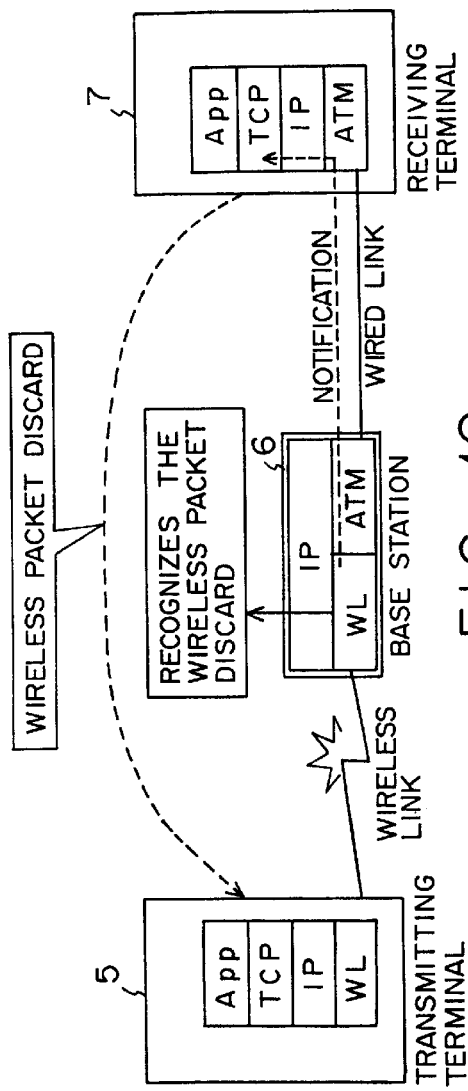
FIG. 10 shows the second example of the connection configuration in which notification of a wireless discard is made.

FIG. 10 shows the second example of the connection configuration in which notification of a wireless discard is made. In FIG. 10, a transmitting terminal is represented by 5 and it corresponds to the wireless terminal 3a (or personal computer 3b including the PHS 3c) shown in FIG. 4. A base station which communicates with the transmitting terminal 5 via a wireless link is represented by 6 and it corresponds to the base station 2 shown in FIG. 4. A receiving terminal which communicates with the base station 6 via a wired link is represented by 7 and it corresponds to the personal computer 1a or workstation 1b shown in FIG. 4. The transmitting terminal 5 shown in FIG. 10 has the same hardware configuration as the terminal 3 shown in FIG. 6, and the base station 6 has the same hardware configuration as the base station 2 shown in FIG. 7. The receiving terminal 7 shown in FIG. 10 has the same configuration as the transmitting terminal 1 shown in FIG. 5.

In the case of the configuration shown in FIG. 10, a wireless packet discard is recognized in the wireless layer (WL) of the base station 6. In this case, notification of the packet discard is made from the wireless layer (WL) of the base station 6 to the TCP layer of the receiving terminal 7 in the forward direction (in the advancing direction of signals). The notification method of a packet discard is described later.

Figure 11:
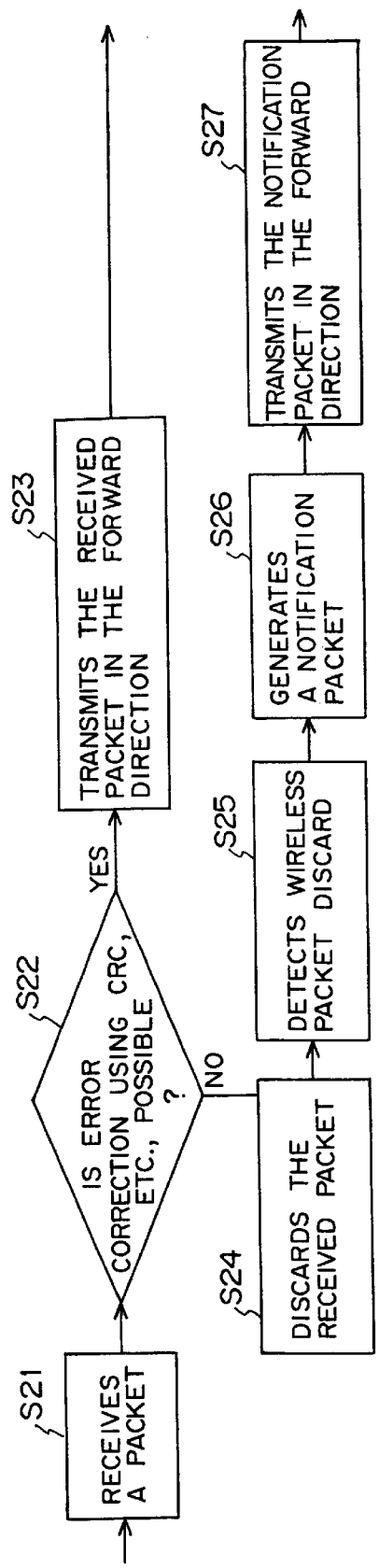
FIG. 11 is a flowchart showing the process of the base station shown in FIG. 10.

FIG. 11 is a flowchart showing the process of the base station 6 shown in FIG. 10. On receipt of a packet from the transmitting terminal 5 via a wireless link (step S21), the base station 6 checks the received packet. If an error is detected in the packet, the base station 6 judges whether an error correction by CRC, etc., is possible (step S22). If the error correction is possible, the base station 6 transmits the received packet in the forward direction (to the receiving terminal shown in FIG. 10) (step S23), and if the error correction is impossible, the base station 6 discards the received packet (step S24). In this way, the base station 6 detects the wireless packet discard (step S25), generates a notification packet for posting notification of the wireless packet discard (step S26) and transmits the notification packet in the forward direction (step S27).

On receipt of the notification packet, the receiving terminal 7 can notify the TCP layer of the transmitting terminal 5 of the packet discard due to a wireless error by transmitting the notification packet to the TCP layer and performing the same process as shown in FIG. 9.

Figure 12:
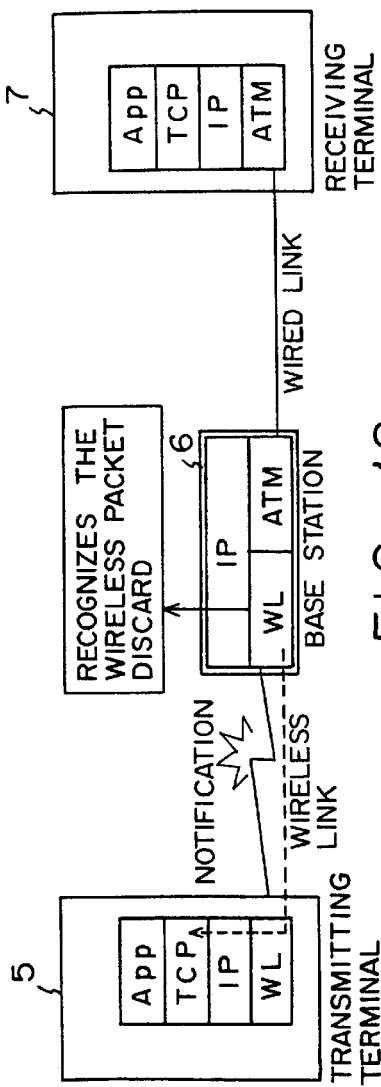
FIG. 12 shows another notification method performed in the connection configuration shown in FIG. 10.

FIG. 12 shows another notification method performed in the connection configuration shown in FIG. 10. In the example connection configuration shown in FIG. 12, the transmitting terminal 5 is connected to the base station 6 via a wireless link, and the base station 6 is connected to the receiving terminal 7 via a wired link, as in FIG. 10. In this configuration, if the wireless layer of the base station 6 detects a packet discard, notification of the wireless packet discard is made from the wireless layer of the base station 6 to the TCP layer of the transmitting terminal 5 located in the backward direction (in the direction to the transmission source). The notification method of the packet discard is described later.

Figure 13:
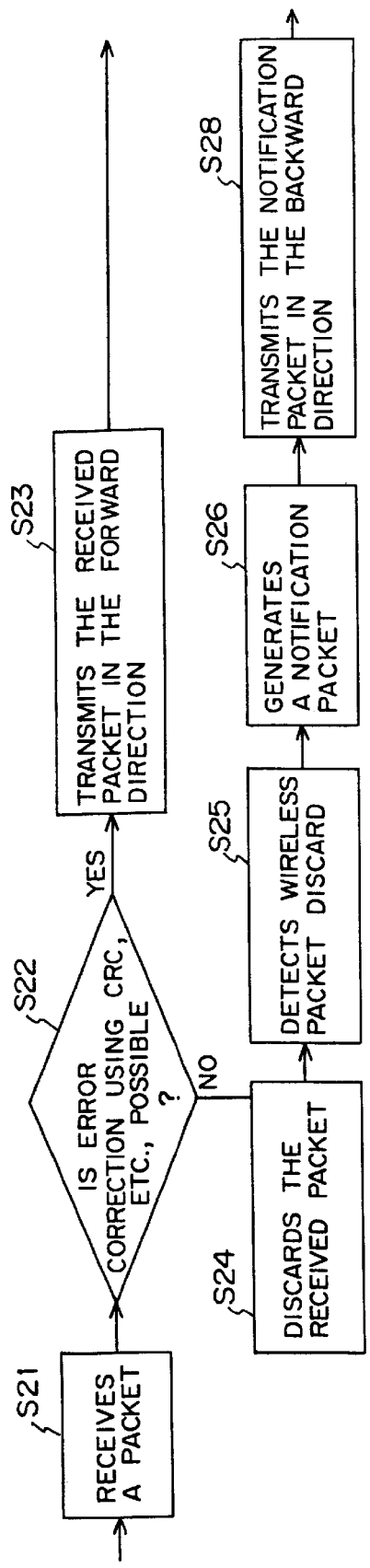
FIG. 13 is a flowchart showing the process of the base station shown in FIG. 12.

FIG. 13 is a flowchart showing the process of the base station shown in FIG. 12. The process contents shown in FIG. 13, excluding step S28, are the same as the process contents shown in FIG. 11, excluding step S27. Specifically, in FIG. 11, a notification packet is transmitted in a forward direction (to the receiving terminal 7) (step S28), while in FIG. 13, a notification packet is transmitted in a backward direction (to the transmitting terminal 5) (step S28).

Figure 14:
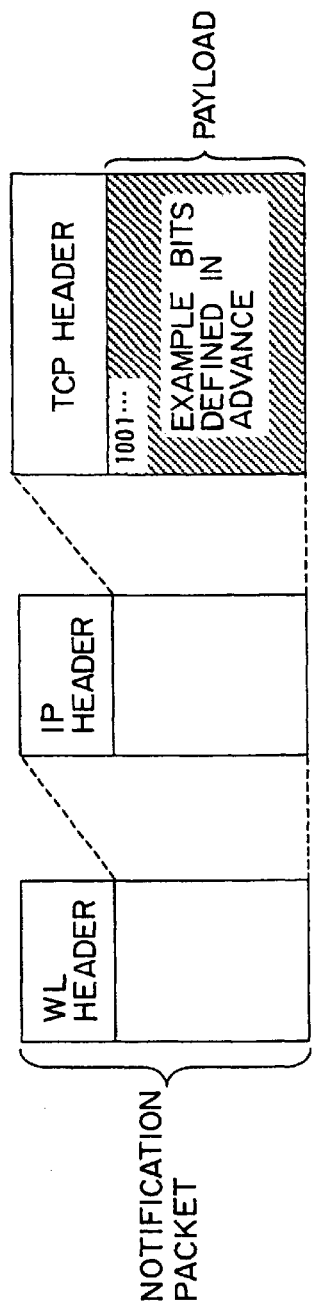
FIG. 14 shows an example of the method for notifying a TCP of a discard from a wireless layer.

FIG. 14 shows an example of the method for posting notification of a packet discard from the wireless layer of a base station to the TCP layer of a transmitting/receiving terminal, and the method can be used for both the packet discard notification from the WL layer to the TCP layer in the configurations shown in FIGS. 5, 10 and 12 and the packet discard notification in the process flows shown in FIGS. 8, 11 and 13. In other words, this notification packet is newly generated in the wireless layer. The notification packet has the structure shown in FIG. 14, and is transmitted to a target terminal like a general packet. When the notification packet reaches the target terminal, the packet is transported to the TCP layer via the WL and IP layers, and describes a bit string for packet discard notification defined in advance as a wireless packet discard in the payload section of the TCP packet. By decoding the definition of the packet discard notification bit in the payload section, the wireless packet discard can be recognized.

Figure 15:
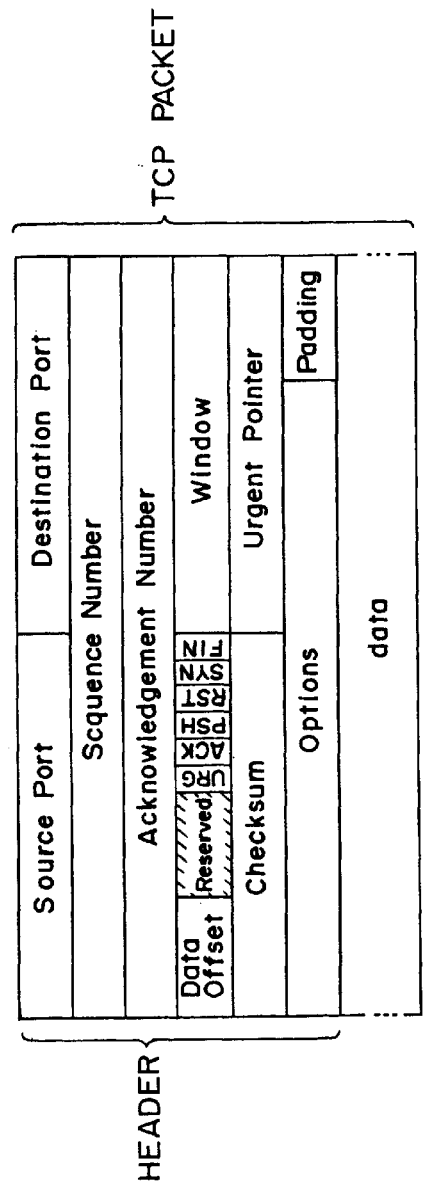
FIG. 15 shows the first example of the notification method of a wireless packet discard caused between terminals.

FIG. 15 shows the first example of the notification method of a wireless packet discard between transmitting and receiving terminals. Notification of a wireless packet discard is made from the receiving terminal that has recognized a packet discard to the transmitting terminal in the configurations shown in FIGS. 5 and 10.

According to the notification method shown in FIG. 15, notification of a wireless packet discard is made using the header of a TCP packet. The header of a TCP packet has an unused area, such as a reserved field (the slashed section shown in FIG. 15). Notification of the wireless packet discard is made using one binary bit consisting of "0" or "1" (indicating whether there is a packet discard, using only one bit) in this area. If there is a wireless packet discard, notification of the wireless packet discard can be made only by inserting a reserve bit when the ACK of a packet received previously is returned. Therefore, a band can be effectively used.

Figure 16:
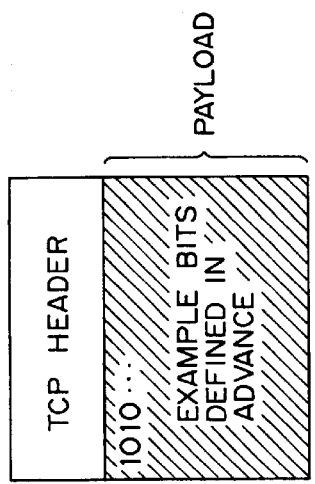
FIG. 16 shows the second example of the notification method of a wireless packet discard caused between terminals.

FIG. 16 shows the second example of the notification method of a wireless packet discard that results between terminals. Although the method shown in FIG. 15 uses the reserved field of the TCP header to post notification of a wireless packet discard, in that case, the header specification must be modified. In the notification method shown in FIG. 16, a bit string defined in advance between transmitting and receiving TCPs is inserted in the data section without using a TCP header, and notification of a wireless packet discard is made using the data of the TCP packet. In this case, the bit string defined in advance between terminals using the data section of the TCP packet is used. Although this method is the same as the method used when notification of a packet discard is made from the wireless layer to the TCP layer of the terminal, which is shown in FIG. 14, notification from a wireless layer to the higher-order layer in the same device and notification between the TCP layers of transmitting and receiving terminals can be simultaneously transmitted by using different bit strings.

When the transmitting terminal 1 shown in FIG. 5 or the transmitting terminal 5 shown in FIGS. 10 and 12 receives a wireless packet discard from the receiving terminal 3 or 7 or from the base station 6, re-transmission control over transmission is exercised. In that case, the transmitting terminal 1 or 5 can exercise different control, such as whether to exercise timer control, which is described below with reference to FIGS. 17 through 20.

Figure 17:
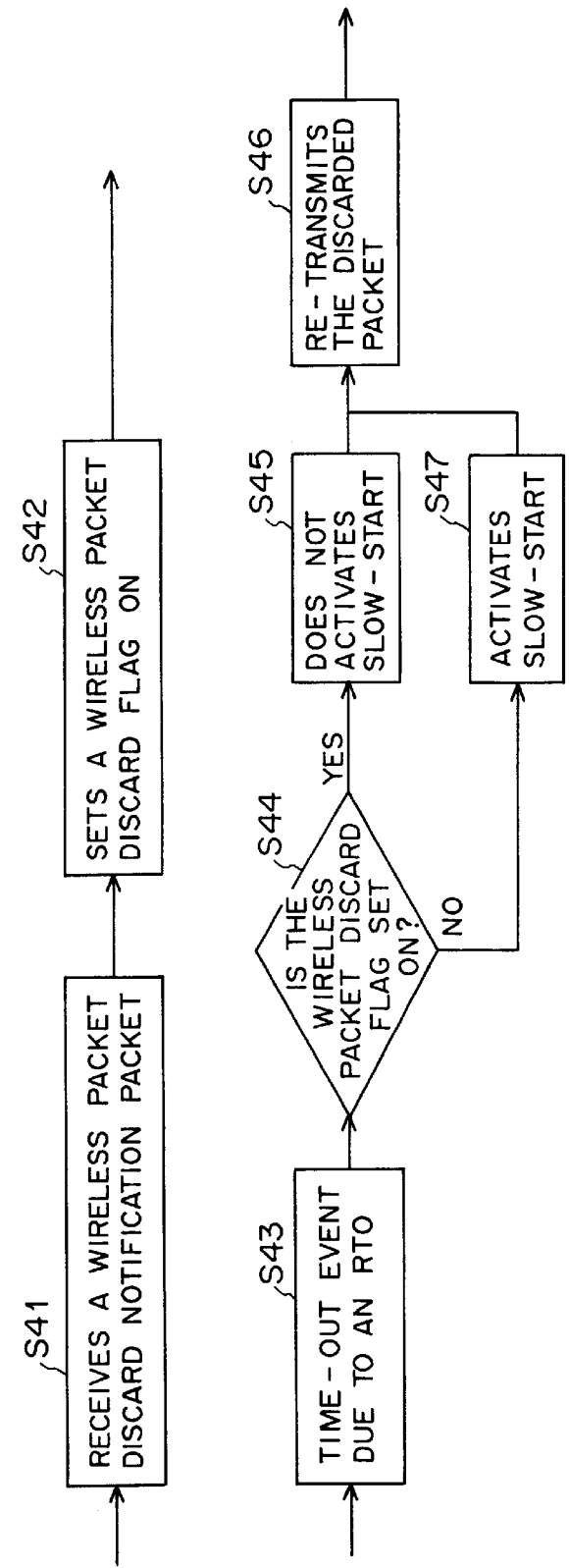
FIG. 17 is a flowchart showing the first example of the process of a TCP layer on the transmitting side.
Figure 18:
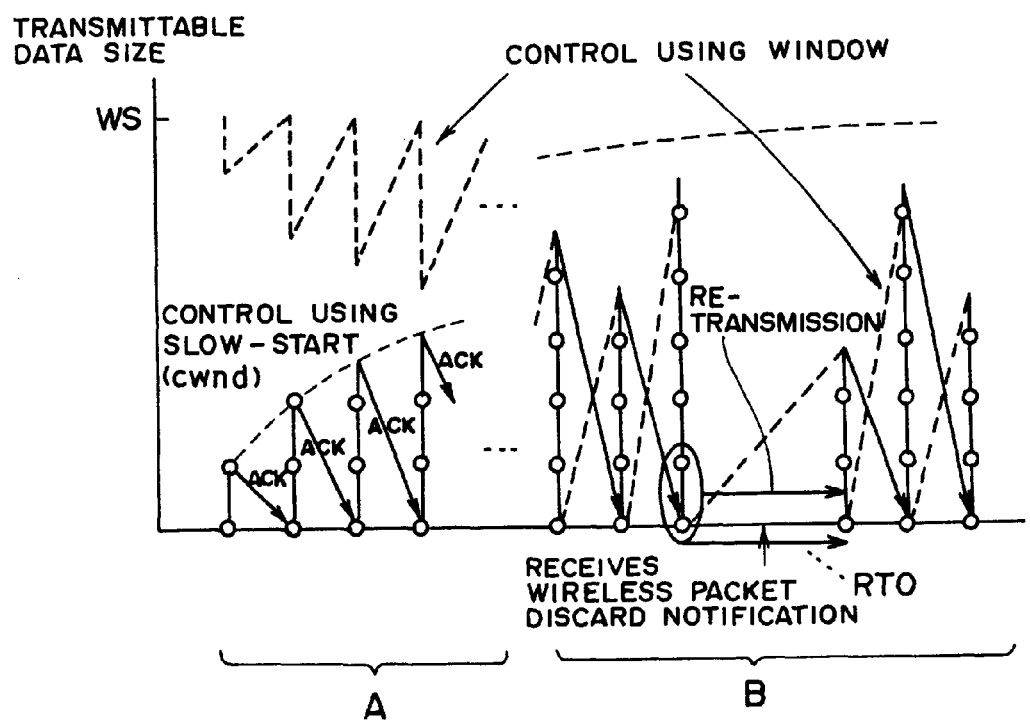
FIG. 18 is a timing diagram showing the re-transmission operation corresponding to FIG. 17.

FIG. 17 is a flowchart showing one process of a TCP layer on the transmitting side and FIG. 18 is a timing diagram showing the re-transmission operation corresponding to FIG. 17. The process shown in FIG. 17 are composed of two operations. On receipt of a wireless packet discard notification packet from the receiving terminal 3 or 7 or from the base station 6 (step S41), first, the transmitting terminal 1 or 5 sets a wireless packet discard flag (step S42). Then, if the time-out event due to an RTO (Re-transmission Time-Out) from a timer occurs (step S43), the transmission terminal judges whether the wireless packet discard flag is on (step S44). If the wireless packet discard flag is on, the transmitting terminal does not start slow-start (step S45) and re-transmits the discarded packet (step S46). If the wireless packet discard flag is not on (including a discard due to congestion) (step S46), the transmitting terminal starts slow-start (step S47) and re-transmits the discarded packet.

FIG. 18 is a time diagram showing the process shown in FIG. 17, and usually the transmission of a packet is started with slow-start (see section A in FIG. 18). However, after a time-out occurs due to an RTO after receiving a wireless packet discard notification, the transmission of a packet is started without slow-start, and the re-transmission is restricted by the window as before (see section B in FIG. 18).

Figure 19:
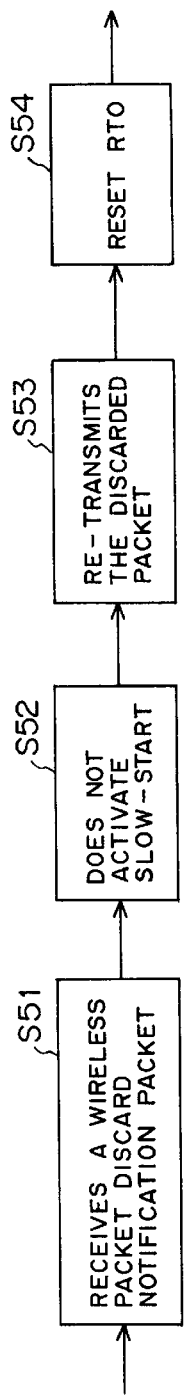
FIG. 19 is a flowchart showing the second example of the process of a TCP layer on the transmitting side.

FIG. 19 is a flowchart showing another process of a TCP layer on the transmitting side.

In the process shown in FIG. 19, on receipt of a wireless discard notification packet from the receiving terminal 3 or 7 or from the base station 6 (step S51), the transmitting terminal 1 or 5 does not start slow-start (step S52) and retransmits the discarded packet (step S53). In this case, if an RTO timer remains set, there is a possibility that the discarded packet may be transmitted twice. Therefore, an RTO is reset (step S54).

Figure 20:
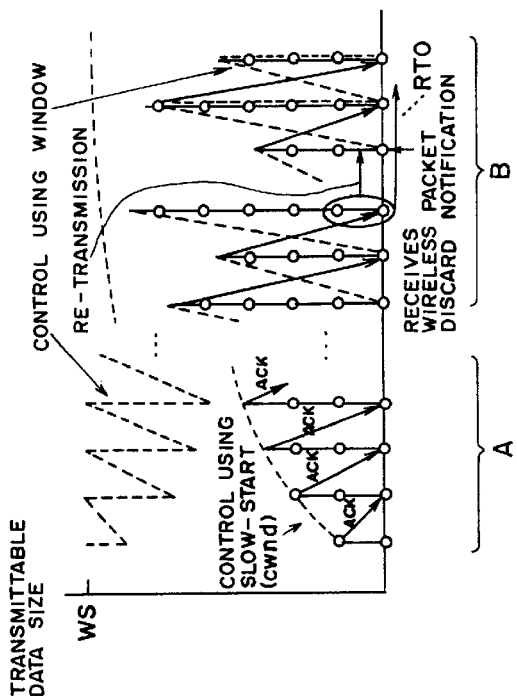
FIG. 20 is a timing diagram showing the process shown in FIG. 19.

FIG. 20 is a timing diagram showing the process shown in FIG. 19. Although the transmission of a packet is started with slow-start as in FIG. 28 (see section A in FIG. 20), if, as shown in FIG. 20, wireless packet discard notification is received, the re-transmission immediately starts, and at that time slow-start control is not exercised (see section B in FIG. 20). In this case, there is no waiting time, which is not the case in the time diagram shown in FIG. 18.

Figure 21:
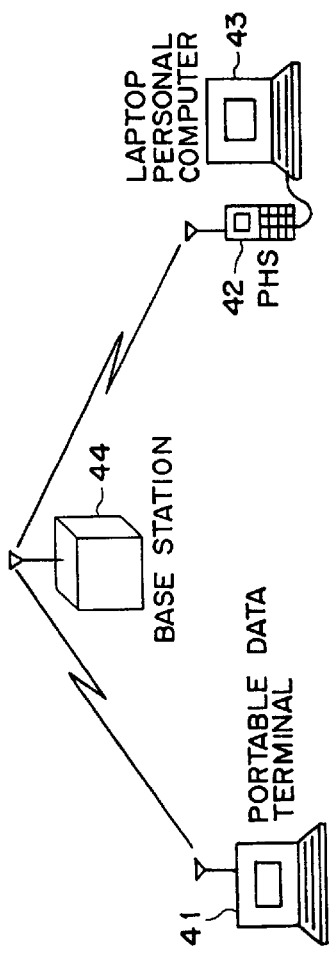
FIG. 21 shows the second example of the system configuration for posting notification of a wireless discard.

FIG. 21 shows the second example of the system configuration for posting notification of wireless packet discard. Although in the example shown in FIG. 4, one terminal communicates with the base station 2 via a wired link and the other terminal communicates with the base station 2 via a wireless link, in the example shown in FIG. 21, both terminals communicate with a base station via a wireless link.

In FIG. 21, a portable data terminal, a PHS, a laptop personal computer connected to a PHS and a base station are represented by 41, 42, 43 and 44, respectively. Both the portable data terminal 41 and laptop personal computer 43 communicate with each other via the base station using a wireless link.

Figure 22:
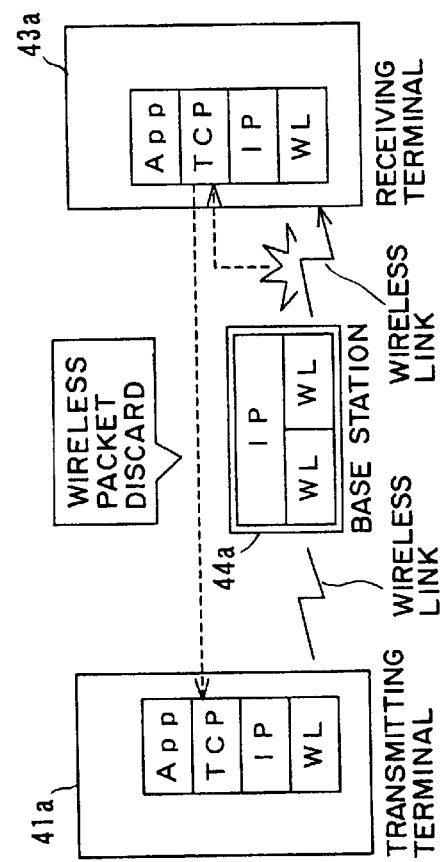
FIG. 22 shows an example of the connection configuration shown in FIG. 21.

FIG. 22 shows an example of the connection configuration shown in FIG. 21.

In FIG. 22, a transmitting terminal which communicates with a base station is represented by 41a and corresponds to the portable data terminal 41 shown in FIG. 21. The transmitting terminal 41a is provided with a WL layer and a TCP layer in the data link layer and transport layer, respectively. A receiving terminal which communicates with the base station via a wireless link is represented by 43a and corresponds to the laptop personal computer 43 including the PHS shown in FIG. 21. The receiving terminal 43a is provided with a WL layer and a TCP layer in the data link layer and transport layer, respectively. The base station is represented by 44a and corresponds to the base station 44 shown in FIG. 21. The base station 44a is provided with WL layers in both the transmitting and receiving sides.

On receipt of a packet transmitted from the transmitting terminal 41a via the base station 44a using a wireless link, the receiving terminal 43a checks whether to discard the packet. If the packet should be discarded, notification of the packet discard is made to the TCP layer of the receiving terminal 43a. On receipt of the packet discard notification, the TCP layer of the receiving terminal 43a notifies the TCP layer of the transmitting terminal 41a of the packet discard notification. By receiving the packet discard notification in the TCP layer, the transmitting terminal 41a can stop a slow-start function which is implemented by the protocol of the TCP layer and re-transmit the packet.

Figure 23:
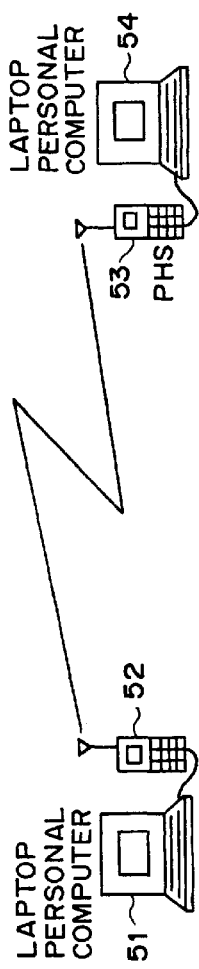
FIG. 23 shows the third example of the system configuration for posting notification of a wireless discard.

FIG. 23 shows the third example of the system configuration for posting notification of a wireless packet discard. Although in the example shown in FIG. 21, two terminals communicate with each other via a base station using a wireless link, in the example shown in FIG. 23, two terminals communicate with each other without a relay via a wireless link.

In FIG. 23, one laptop personal computer connected to one PHS, and another PHS connected to another laptop are represented by 51, 52 and 53, and 54, respectively. The laptop personal computers 51 and 54 directly communicate with each other via a wireless link.

Figure 24:
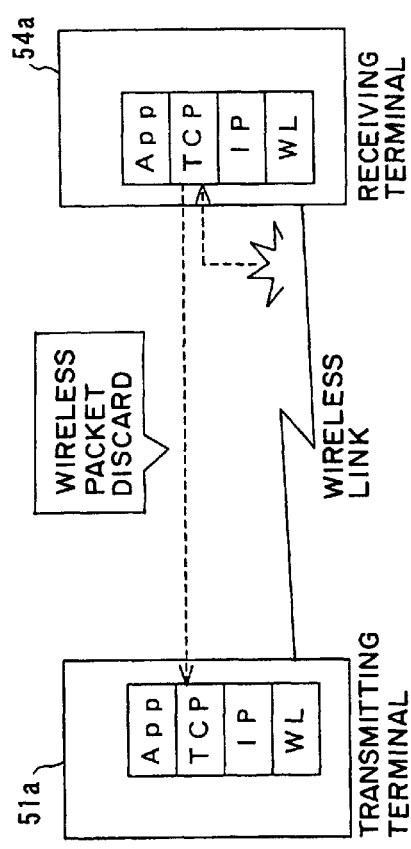
FIG. 24 shows an example of the connection configuration shown in FIG. 23.

FIG. 24 shows an example of the connection configuration shown in FIG. 23.

In FIG. 24, a transmitting terminal which communicates via a wireless link is represented by 51a and it corresponds to the laptop personal computer 51 including the PHS 52 shown in FIG. 23. The transmitting terminal 51a is provided with a WL layer and a TCP layer in the data link layer and transport layer, respectively. A receiving terminal which communicates via a wireless link is represented by 54a and it corresponds to the laptop personal computer 54 including the PHS 53 shown in FIG. 23. The receiving terminal 54a is provided with a WL layer and a TCP layer in the data link layer and transport layer, respectively.

On receipt of a packet transmitted from the transmitting terminal 51a via a wireless link, the receiving terminal 54a checks whether to discard the packet. If the packed should be discarded, notification of the discard of the packet is made to the TCP layer of the receiving terminal 54a. On receipt of the packet discard notification, the TCP layer of the receiving terminal 54a notifies the TCP layer of the transmitting terminal 51a of the packet discard. By receiving the packet discard notification in the TCP layer, the transmitting terminal 51a can stop the slow-start function, which is implemented by the protocol on the TCP layer, and re-transmit the packet.

Figure 25:
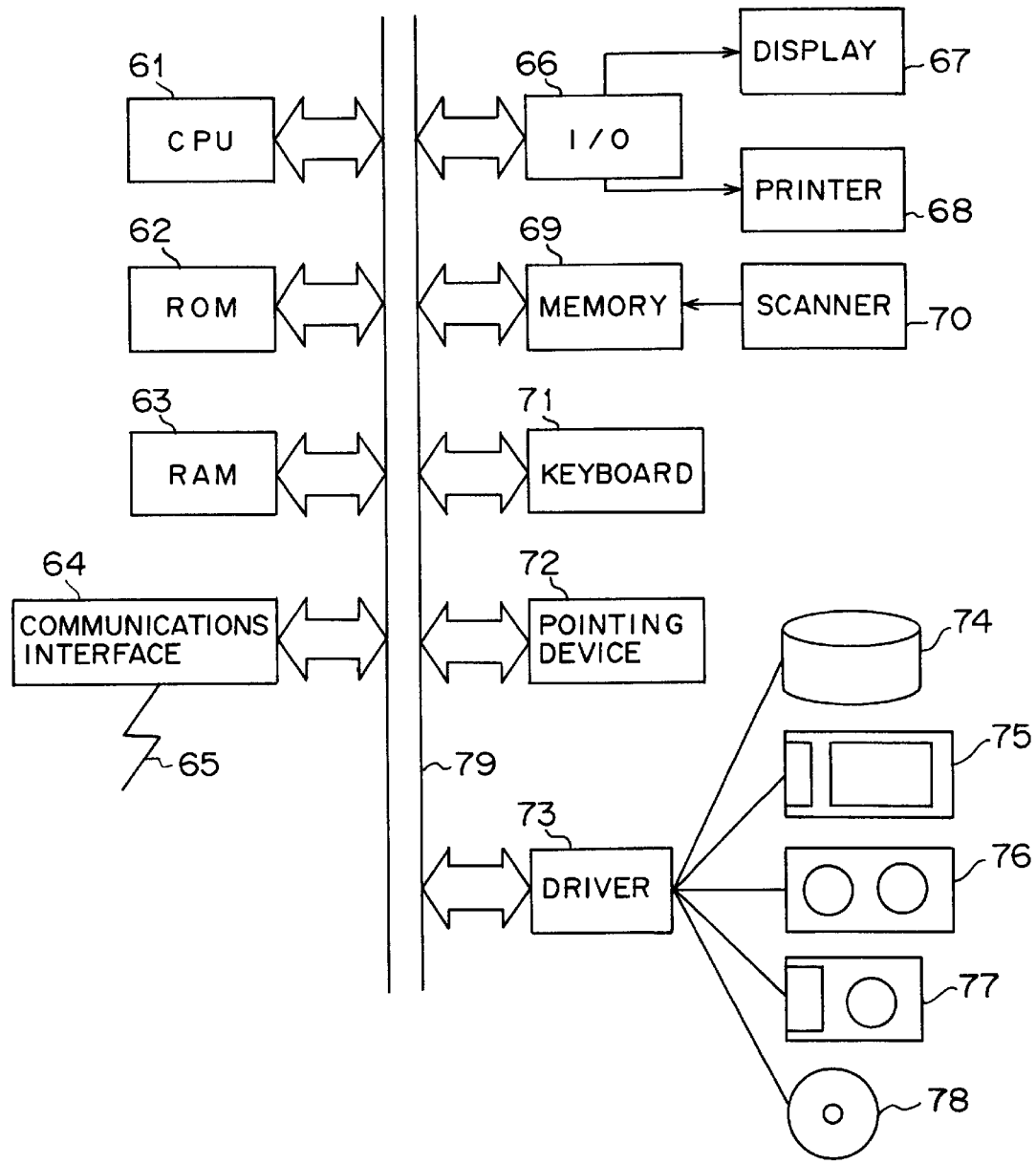
FIG. 25 shows the configuration for implementing the transmitting terminal and receiving terminal in one preferred embodiment of the present invention using software.

FIG. 25 shows the configuration for implementing the transmitting terminal and receiving terminal in one preferred embodiment of the present invention using software.

In FIG. 25, a central processing unit (CPU) for performing an overall process, a read-only memory (ROM), a random access memory (RAM), a communications interface, a communications network, an input/output interface, a display for displaying transmitting/receiving data, a printer for printing transmitting/receiving data, a memory for temporarily storing data read by a scanner, a scanner for reading input images, etc., a keyboard, a pointing device, such as a mouse, etc., a driver for driving a storage medium, a hard disk, an IC memory card, a magnetic tape, a floppy disk, an optical disk, such as CD-ROM, DVD-ROM, etc., and a bus are represented by 61, 62, 63, 64, 65, 66, 67, 68, 69, 70, 71, 72, 73, 74, 75, 76, 77, 78 and 79, respectively.

A communication program using TCP control, transmitting/receiving data, etc., are stored in a storage medium, such as the hard disk 74, IC memory card 75, magnetic tape 76, floppy disk 77, optical disk 78, etc. A communications process can be performed by reading the communications program using TCP control, etc. from the above storage media and storing it in the RAM 63. The communications program using TCP control, etc., can also be stored in the ROM 62.

Furthermore, the communications program using TCP control, transmitting/receiving data, etc., can also be extracted from the communication network 65 via the communication interface 64. For the communication network 65 connected to the communication interface 64, for example, a LAN (Local Area Network), a WAN (Wide Area Network), the Internet, an analog telephone network, an ISDN (Integral Service Digital Network), a PHS (Personal Handy-phone System) and a wireless communications network, such as satellite communications, etc., can be used.

If a transmitting program using TCP control is started, the CPU 61 performs the transmission/reception of a packet while exercising slow-start control. Then, if the TCP layer receives a packet discard notification transmitted via a wireless link, the CPU 61 stops the slow-start control of the packet and re-transmits the packet.

If a receiving program using TCP control is started, the CPU 61 also checks whether a packet is discarded when the wireless layer receives the packet. If the packet is discarded, the CPU 61 notifies the TCP layer on the receiving side of the packet discard, and posts notification of the packet discard notification from the TCP layer on the receiving side to the TCP layer on the transmitting side.

As described above, according to the present invention, in packet communications via a wireless link, the reduction of throughput can be avoided by implementing the rate control of a TCP layer suited for a wireless environment. Specifically, when there is a packet discard due to fading, etc., in a wireless link, re-transmission can be efficiently performed without the reduction of the rate by controlling the TCP layer, and thereby, the present invention can be suited for communications equipment.

What is claimed is:

1. A data communications method, comprising the steps of:
    detecting a discard due to congestion of a packet;
    re-transmitting the packet using slow-start, if the discard due to congestion of a packet is detected;
    detecting a discard due to a cause other than congestion of a packet; and
    re-transmitting the packet without slow-start if the discard due to a cause other than congestion of a packet is detected, wherein the packet transmitted from a base station to a receiving terminal via a wireless link is encoded using a code provided with an error correction function,
    the receiving terminal comprises means for judging that the packet is discarded due to a wireless error and notifying a TCP layer of the wireless packet discard, if it is judged that an error of the packet cannot be corrected in a wireless layer of a side that receives the packet, and
    a TCP layer control unit notifies a transmitting terminal of the wireless packet discard.

2. A computer-readable storage medium on which is recorded a program enabling a computer to execute a process, said process comprising the steps of:
    performing data communications using a TCP layer;
    detecting a discard of a packet transmitted via a wireless link; and
    stopping a slow-start function of the TCP layer and re-transmitting the packet, if the discard of a packet is detected,
    wherein the packet transmitted from a base station to a receiving terminal via a wireless link is encoded using a code provided with an error correction function,
    the receiving terminal comprises means for judging that the packet is discarded due to a wireless error and notifying the TCP layer of the wireless packet discard, if it is judged that an error of the packet cannot be corrected in a wireless layer of a side that receives the packet, and
    a TCP layer control unit notifies a transmitting terminal of the wireless packet discard.

3. A TCP layer rate controlling system adopted in association with a packet communication realized in a manner in which a transmitting terminal and a base station are linked by a wired or wireless connection and the base station and a receiving terminal are linked by a wireless connection for the transmitting terminal to transmit packets to the receiving terminal via the base station, wherein, packets transmitted from the base station to the receiving terminal by the wireless connection are encoded using a code provided with an error correction function and wherein, in particular, the receiving terminal is comprised of:
    a packet-discarding-act detecting unit detecting an act of discarding a packet damaged by a wireless connection error, which may take place any time during a packet transmission from the transmitting terminal to the receiving terminal; and
    a first packet-discarding-act reporting unit reporting about the packet-discarding-act detected by the packet-discarding-act detecting unit to the transmitting terminal,
    to cause the TCP layer of the transmitting terminal, being exempted from a slow-start control, to re-transmit the discarded packet at a transmission rate, the transmission rate having been adopted before receiving the report about the packet-discarding-act, when the transmitting terminal receives the report from the first packet-discarding-act reporting unit about the packet-discarding-act, the receiving terminal further comprising:

a second packet-discarding-act reporting unit disposed at a wireless layer of the receiving terminal for reporting about the packet-discarding-act to a TCP layer of the receiving terminal when recognizing the packet-discarding-act, the packet-discarding-act having been detected by the packet-discarding-act detecting unit beside the first packet-discarding-act reporting unit being disposed at the TCP layer of the receiving terminal.

4. The TCP layer rate controlling system according to claim 3, wherein, in particular, the second packet-discarding-act reporting unit causes causes the first packet-discarding-act reporting unit to report from the TCP layer of the receiving terminal to the TCP layer of the transmitting terminal about the packet-discarding-act when the second packet-discarding-act reporting unit reports to the TCP layer of the receiving terminal about the packet-discarding-act.

5. The TCP layer rate controlling system according to claim 4, wherein, in particular, the base station is farther comprised of:

an encoder unit encoding the packets transmitted to the receiving terminal via the wireless connection using a code set incorporating an error correction function, for causing the second packet-discarding-act reporting unit to judge a detection of an error correction failure associated with any of the packets received in the wireless layer to represent a conduct of a packet-discarding-act and report about the packet-discarding-act to the TCP layer of the receiving terminal.

6. A TCP layer rate controlling system adopted in association with a packet communication realized in a manner in which a transmitting terminal and a base station are linked by a wireless connection and the base station and a receiving terminal are linked by a wired connection for the transmitting terminal to transmit packets to the receiving terminal via the base station, wherein, packets transmitted from the transmitting terminal to the base station by the wireless connection are encoded using a code provided with an error correction function and wherein, packets transmitted from the transmitting terminal to the base station by the wireless connection are encoded using a code provided with an error correction function and wherein, in particular, the base station is comprised of:

a packet-discarding-act detecting unit disposed in a wireless layer and detecting an act of discarding a packet damaged by a wireless connection error, which may take place any time during a packet transmission from the transmitting terminal to the base station; and a first packet-discarding-act reporting unit reporting about the packet-discarding-act detected by the packet-discarding-act detecting unit from said wireless layer to a TCP layer of the receiving terminal, and further, the receiving terminal is comprised of:

a second packet-discarding-act reporting unit reporting to a TCP layer of the transmitting terminal, via the wireless layer extending from the wireless layer of the base station to the transmitting terminal, about the packet-discarding-act reported from the first packet-discarding-act reporting unit, to cause the TCP layer of the transmitting terminal, being exempted from a slow-start control, to re-transmit the discarded packet at a transmission rate, the transmission rate having been adopted before receiving the report about the packet-discarding-act, when the transmitting terminal receives the report from the second packet-discarding-act reporting unit about the packet-discarding-act.

7. The TCP layer rate controlling system according to claim 4, wherein, in particular, the second packet-discarding-act reporting unit is caused to set, within a payload part of a TCP packet, a bit Bay in a manner so pre-defined between the transmitting terminal and the receiving terminal to report about the packet-discarding-act from the wireless layer of the receiving terminal to the TCP layer of the receiving terminal.

8. The TCP layer rate controlling system according to claim 4, wherein, in particular, the first packet-discarding-act reporting unit is caused to set, within a header part of a TCP packet, a bit indicating the packet-discarding-act to report about the packet-discarding-act from the TCP layer of the receiving terminal to the TCP layer of the transmitting terminal.

9. The TCP layer rate controlling system according to claim 7, wherein, in particular, the transmitting terminal is further comprised of:

a flag being for a packet-discarding-act and established when the first packet-discarding-act reporting unit reports about the packet-discarding-act; and a timer commencing a countdown action for a re-boot, to cause the TCP layer of the transmitting terminal, being exempted of slow-start control, to re-transmit the discarded packet at a transmission rate, the transmission rate having been adopted before receiving the report about the packet-discarding-act, if the flag for the packet-discarding-act is on when the timer goes off.

10. The TCP layer rate controlling system according to claim 9, in which, in particular, the TCP layer of the transmitting terminal is caused to re-transmit the discarded packet at a transmission rate, the transmission rate having been adopted before receiving the report about the packet-discarding-act, and to reset the timer when notified of the packet-discarding-act from the first packet-discarding-act reporting unit.

* * * * *